United States Patent [19]

Pluss

[11] 4,114,776
[45] Sep. 19, 1978

[54] CONTAINER, PARTICULARLY FOR COLLECTING PRODUCTS TO BE RECYCLED

[76] Inventor: Ernest Pluss, 115, route de Peney, 1214 Vernier, Switzerland

[21] Appl. No.: 752,553

[22] Filed: Dec. 20, 1976

[30] Foreign Application Priority Data

Dec. 22, 1975 [CH] Switzerland ............... 16652/75

[51] Int. Cl.² .................. B65D 85/00; B65D 25/04
[52] U.S. Cl. .......................... 220/22; 220/1 T; 220/20.5; 217/8; 232/43.1
[58] Field of Search .............. 220/20, 22, 22.1, 22.2, 220/1 T, 20.5; 217/8; 232/43.1

[56] References Cited

U.S. PATENT DOCUMENTS

| | | | |
|---|---|---|---|
| 958,414 | 5/1910 | Mast | 220/1 T |
| 992,006 | 5/1911 | Kubersky et al. | 220/22 |
| 1,191,589 | 7/1916 | Gutowski et al. | 232/43.1 X |
| 2,748,972 | 6/1956 | Cummins | 217/8 X |
| 3,893,615 | 7/1975 | Johnson | 220/20 X |

Primary Examiner—William Price
Assistant Examiner—Steven M. Pollard
Attorney, Agent, or Firm—Robert E. Burns; Emmanuel J. Lobato; Bruce L. Adams

[57] ABSTRACT

A container for collecting products to be recycled comprises a tall, long and relatively narrow generally rectangular body having openings along the top of its longer side walls for introducing products, and an outlet in a narrow end wall for removing collected products by tipping the container. The container body is preferably divided by transverse partitions into separate compartments of adjustable volume for receiving different products which can be removed separately through the outlet by freeing lower flaps on the partitions.

3 Claims, 4 Drawing Figures

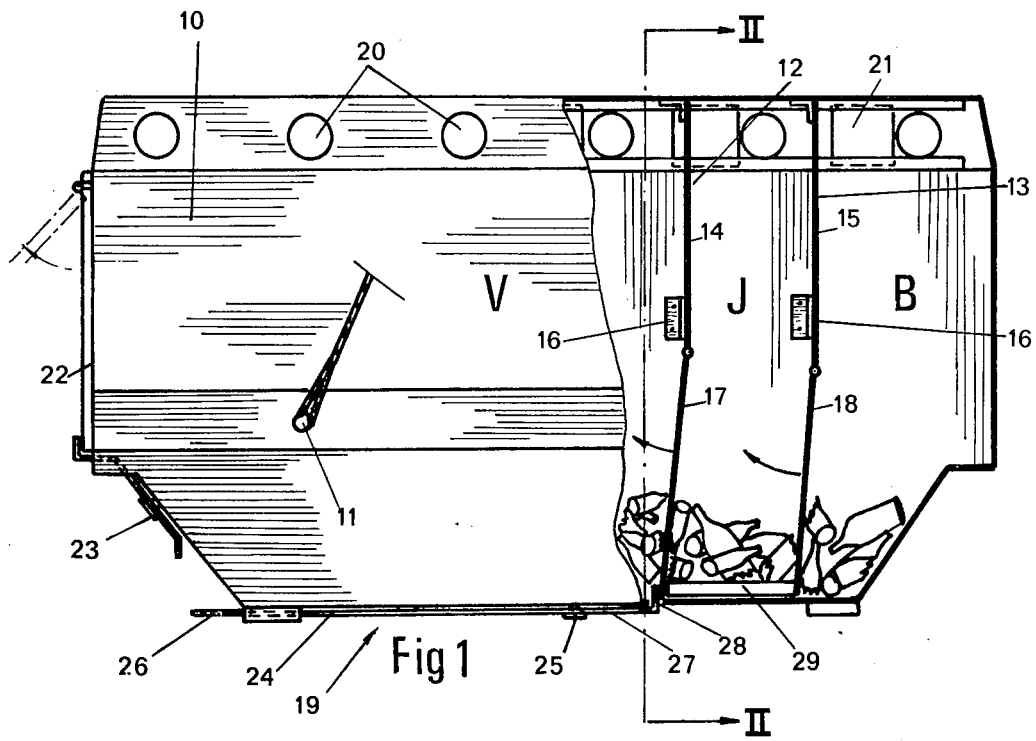
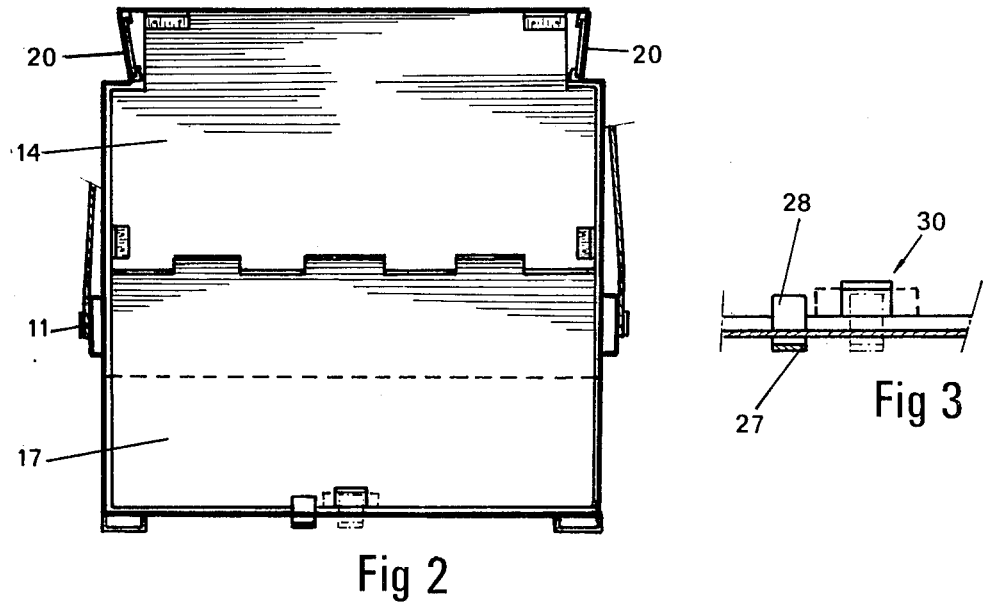

CONTAINER, PARTICULARLY FOR COLLECTING PRODUCTS TO BE RECYCLED

BACKGROUND OF THE INVENTION

The invention relates to containers particularly, but not exclusively, for collecting products recuperated for recycling. At the present time, increasing efforts are being made to recuperate used products, for example containers such as glass bottles and tin cans, newspapers, and so on to recycle the materials of which they are made.

However, the recuperation of such products from consumers poses numerous problems, in particular the making available of adequate collecting centres in easily accessible places. For this purpose, the use of transportable containers or collectors which are placed on or beside the public road and in which the public deposits the products to be recuperated is in general considered to be advantageous.

The known containers or collectors of this type usually have a rectangular base so that several containers can be placed onto the platforms of a lorry to transport them.

However, known containers or collectors of this type have serious drawbacks. The products to be recuperated are inserted through orifices in transverse (i.e. narrow end) walls, which leads to incomplete filling. Sometimes, the end parts of the container become completely filled and no more products can be introduced even though the middle of the container is only about half full.

Further, when a single container is previewed for collecting different products, it is divided by several fixed, vertical longitudinal partitions into several compartments each having an opening in the narrow transverse end wall for the insertion of the products. These partitions are relatively large and sturdy and are necessarily fixed so that any possibility of modifying the relative volumes of the various compartments to receive different quantities of products is precluded.

SUMMARY OF THE INVENTION

An aim of the invention is to provide such a container which does not suffer from the principal fault of the known containers that they cannot easily be completely filled.

According to the invention, such a container comprises a body of generally rectangular shape in plan having long side walls joined by narrow end walls and a bottom and having a greater height than width, a plurality of discrete openings spaced along the top of the container body for the introduction of products, and an outlet in an end wall for emptying the container.

In a preferred embodiment, for the collection of different products to be recycled, the container comprises transverse partitions dividing the container body into a plurality of discrete compartments each associated with at least one said opening. Advantageously, these partitions can be set in different positions to modify the volumes of the different compartments.

Also, at least a part of each such partition may be formed by a flap, the container comprising means for locking the flaps in a closed position and for individually unlocking the flaps to allow the contents of the different compartments to be successively removed through the outlet.

BRIEF DESCRIPTION OF THE DRAWINGS

The accompanying drawings show, by way of example, two embodiments of the invention for the collection of receptacles of glass, such as bottles and jars of different colours. In the drawings:

FIG. 1 is a partly cut-away side elevational view of a first embodiment of container;

FIG. 2 is a cross-section view along section line II—II of FIG. 1;

FIG. 3 is an enlarged scale view of a detail of the first embodiment; and

DESCRIPTION OF THE PREFERRED EMBODIMENT

Figure 4:
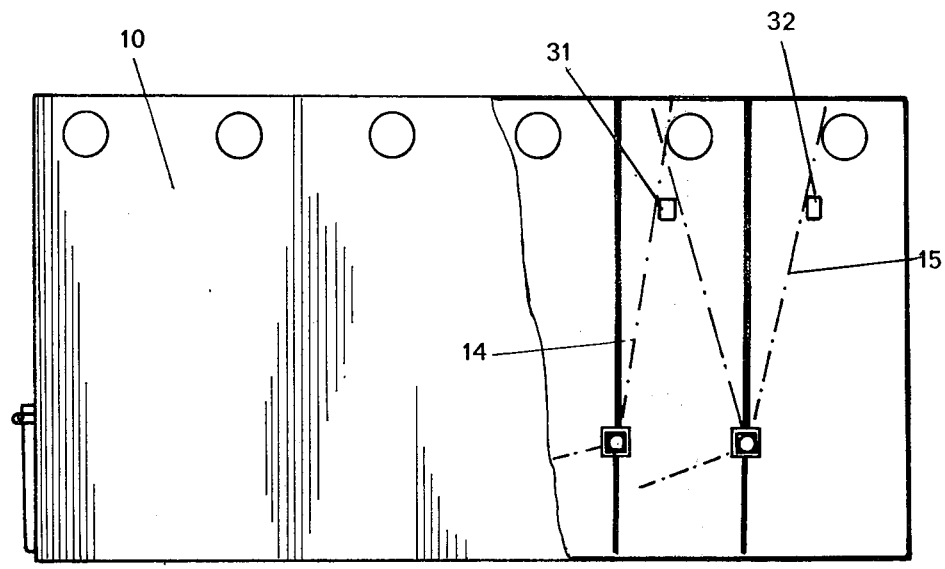
FIG. 4 is a schematic view of a second embodiment.

The container shown in FIGS. 1 to 3 is formed of a generally rectangular prismatic hopper 10 of plate steel lined inside with phonic insulation plates, not shown. This container is transported with several similar containers on the platform of a lorry and emptied of its contents by tipping it without unloading it from the lorry. Two tenons 11 are provided on either side of the container for the attachment of cables or slings by which the container can be lifted and tipped.

The hopper 10 is divided into three compartments V, J, B respectively for receiving receptacles of green, yellow and white glass. These compartments are separated by two transverse partitions 12 and 13 whose positions may be chosen as a function of the presumed or statistically established ratios of the quantities of receptacles of different colours to be collected.

The partitions 12 and 13 are formed of fixed upper panels 14, 15 which are mounted on longitudinal side walls of the container by means of brackets 16 in a manner to be easily movable, and of flaps 17, 18 hinged to the lower edges of the respective panels 14 and 15.

The lower edges of the flaps 17 and 18 bear by their own weight against the bottom of the container; they are normally locked in this vertical position by an externally actuable locking device 29 which will be described in detail later.

Twelve ports 20 are arranged, in pairs, six on each side, in the upper part of the longitudinal side walls of the container for the introduction of receptacles. Each port 20 can be closed for transport by means of a sliding plate 21. At least one port on each side of the container corresponds to a respective compartment. Thus, in the illustrated example, the narrowest compartments B and J each have one port 20 on each side, whereas the compartment V has four.

An outlet orifice through which the collected receptacles can be removed is formed by a rectangular opening in one of the narrow transverse end walls of the container. This orifice is normally closed by a flap 22 articulated about a horizontal axis and which can be locked in the closed position by means of a lever 23.

The locking device 19 enables each compartment to be emptied in turn; it comprises a lever 24 pivoted at 25 about a vertical axis and actuable from outside the container by a protruding end 26 of its long arm. The small arm 27 of lever 24 terminates with an upstanding flange 28 passing through a slot in the bottom of the container and which normally locks the flap 18 by the intermediate of a foot 29 welded to the latter (FIGS. 2 and 3). By pivoting the lever 24, the flange 28 can be brought to face an opening 30 in the edge of flap 17 to free the latter and allow it to tip under the action of its weight and the load contained in the compartment J when the container is inclined. When the flange 28 coincides with the opening 30, the foot 29, wider than the opening 30, abuts against the flange 28, so that the flap 18 remains locked. To free the flap 18 after emptying the compartment J, the lever 24 is returned to its initial position, which allows the foot 29 to escape from the bracket 28. The flap 18 is thus freed and can tip in turn under the action of its weight and the load in the compartment B.

To summarize, removal of the used receptacles takes place in successive phases as follows: the container is tipped; the flap 22 is unhooked, which enables the compartment V to be emptied; the flap 17 is freed which enables compartment J to be emptied; and, finally, the flap 18 is freed which enables the compartment B to be emptied.

In the embodiment shown schematically in FIG. 4, the container 10 is box-like and the panels 14 and 15 are not fixed vertically but are freely pivotable about the same axis as the corresponding flaps 17 and 18. The panels 14 and 15 can be inclined between two stops 31 and 32 and locked in corresponding positions, or even in intermediate positions. In this manner, one may modify within certain limits the volumes of the compartments and adapt the ratio of these volumes to the quantities of different receptacles collected which often varies from one place to another.

In another embodiment akin to that of FIG. 4, the panels 14 and 15 can freely tip between two abutments against the action of a spring which tends to return them to the vertical position. In this manner, they automatically incline in either direction under the action of the receptacles filling the adjacent compartments. The volumes of the compartments thus adapt automatically to the quantities of receptacles they receive. The return spring of this variation will advantageously be formed by a torsion bar forming the axis and fixed with the panel.

Finally, it is possible to envisage use of the container according to the invention in other domains than the recuperation of used products, for example for the transport in bulk of, inter alia, materials and goods of different characteristics, for example building materials, or even agricultural products. In this instance, the container may be open in its upper part to permit rapid loading, the discrete inlet openings in the open top being defined by transverse partitions.

What is claimed is:

1. A container, particularly for products recuperated for recycling, comprising a body of generally rectangular shape in plan having long side walls joined by narrow end walls and a bottom and having a greater height than width, means defining a plurality of discrete openings spaced along the top of the container body for the introduction of refuse products, transverse partitions dividing the container body into a plurality of discrete compartments each associated with at least one said opening, each partition being formed by a fixed vertical upper panel spaced above the bottom of the container and a lower flap hinged to a lower edge of the panel, and means for locking the flaps in a closed position and for individually unlocking the flaps to allow the contents of the different compartments to be successively removed through said outlet means.

2. A container according to claim 1, in which each upper panel is pivoted with its lower flap about a common axis between two stops against the action of a spring tending to return the upper panel to an intermediate position.

3. A container according to claim 1, in which the container body comprises a closed top wall, said openings being disposed in opposite pairs along the tops of the side walls.

* * * * *